United States Patent [19]

Van de Sande et al.

[11] Patent Number: 4,477,554
[45] Date of Patent: Oct. 16, 1984

[54] DIFFUSION TRANSFER MATERIAL AND PROCESS

[75] Inventors: Christian C. Van de Sande, Belsele; André Verhecken, Mortsel, both of, Belgium

[73] Assignee: Agfa-Gevaert, N.V., Mortsel, Belgium

[21] Appl. No.: 545,434

[22] Filed: Oct. 26, 1983

[30] Foreign Application Priority Data

Nov. 12, 1982 [GB] United Kingdom ............... 8232448

[51] Int. Cl.³ .................... G03C 1/40; G03C 7/00; G03C 5/54
[52] U.S. Cl. ................................. 430/223; 430/559
[58] Field of Search ....................... 430/223, 559

[56] References Cited

U.S. PATENT DOCUMENTS 4,232,107 11/1980 Janssens ........................... 430/223
4,371,604 2/1983 de Sande et al. .................. 430/223

Primary Examiner—Richard L. Schilling
Attorney, Agent, or Firm—A. W. Breiner

[57] ABSTRACT

A photographic material for diffusion transfer photography containing a quinonoid compound, which is capable in reduced state and under alkaline conditions of releasing a dye moiety for the production of a dye image and corresponds to the following general formula (G):

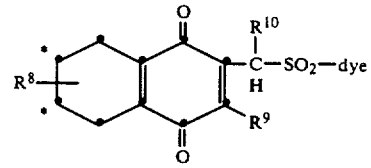

wherein:

$R^8$ is hydrogen or methyl in the 6- or 7-position (indicated by an asterisk) on the saturated adjacent ring part of the quinonoid nucleus, $R^9$ is an alkyl group or a substituted alkyl group, an aromatic group or a substituted aromatic group, $R^{10}$ is hydrogen, an alkyl group or an aryl group, and at least one of the substituents $R^9$ and $R^{10}$ represents or includes a ballasting group of sufficient size to render said compound immobile in an alkali-permeable hydrophilic colloid layer when such layer is permeated with an aqueous alkaline liquid.

5 Claims, No Drawings

DIFFUSION TRANSFER MATERIAL AND PROCESS

The present invention relates to a photographic material containing at least one silver halide photo-sensitive image-recording layer to which is associated operatively at least one non-diffusible substance which in reduced state under hydrolysing conditions yields a mobile, photographically useful compound, in particular a diffusible dye suitable for diffusion transfer photography.

Photographic diffusion transfer processes have been known for several years and are summarized e.g. in "Imaging Systems" by Kurt I. Jacobson and Ralph E. Jacobson, 1977, The Focal Press.

Photographic image-transfer processes are based upon image formation in a photosensitive image-recording layer and diffusion in an image-wise pattern of at least one substance out of said layer to form an image in an adjacent image-receiving layer and/or to leave an image-wise distributed substance in the recording layer.

In diffusion transfer colour processes a dye providing substance is associated with a silver halide emulsion. The coloured image is produced by conversion of the initially non-diffusible dye-providing substance into a diffusible form or a diffusible product as a result of a silver halide development related chemical reaction. The mobilized dyes or dye-precursors thus produced diffuse into a receiving layer where the final coloured image is retained.

Most frequently the transferred dye-image is to be a positive image of the original so that the dye diffusion transfer process should bring about an image reversal when the image recorded in a silver halide material is negative. This reversal can be achieved either in the silver halide development step or in the image-wise production of (a) diffusible dye(s) from initially non-diffusible dye providing substances.

Depending upon the type of silver halide emulsion used different kinds of dye providing systems are required to produce a positive transferred dye image.

If direct-positive silver halide emulsions are used positive image production with respect to the original requires that the dye providing system must yield (a) diffusible dye(s) in the non-exposed areas to an extent which is directly proportional to the degree of non-exposure, whereas no such diffusible dye(s) should be released in the exposed areas. Among the systems fulfilling this requirement are the so-called diffusible dye releasing (DDR) compounds described e.g. in U.S. Pat. No. 3,227,550—U.S. Pat. No. 3,443,940 and U.S. Pat. No. 3,751,406. Other suitable systems apply dye-releasing redox (DRR) compounds which cleave upon oxydation whereas their reduced state is stable to the processing conditions. When such DRR compounds are used in association with a developing silver halide emulsion of the direct-positive type cross-oxydation of the non-diffusible DRR compound with oxidized silver halide developer yields an alkali-labile oxidation product in the non-exposed areas only and hence a positive image-wise distribution of diffusible dye. Examples of image-wise cleaving DRR compounds are described in U.S. Pat. No. 3,628,952—GB Pat. No. 1,405,662—DE-OS No. 2,645,656 and Research Disclosures 12 832 (1974) and 15 157 (1976).

For image reversal with negative silver halide emulsions the dye providing system should yield likewise diffusible dyes in the unexposed areas and progressively block the release of dye in the exposed areas depending on the degree of exposure. So-called dye-developers, e.g. those described in U.S. Pat. No. 2,983,606, are suitable for this purpose. These compounds are soluble in the alkaline processing fluids and hence are diffusible; in the exposed areas, however, cross-oxidation with oxidized silver halide developer will turn them into non-soluble, non-diffusible oxidation products.

According to another reversal process so-called IHO (Inhibited hydrolysis by oxydation) compounds can be used. The IHO compounds carry a ballast group and are initially immobile in the hydrophilic colloid layer wherein they are incorporated. Their main characteristic is that they are alkali-labile in reduced state so as to release a diffusible dye in the unexposed area. In the exposed areas the IHO-compounds cross-oxidize with oxidized silver halide developer and are converted into their alkali-stable, still ballasted oxidized counterparts. Examples of IHO-compounds are described in DE-OS Nos. 2,402,900-2,543,902 and 2,654,213.

An alternative to these IHO-compounds are the IHR (Increased Hydrolysis by Reduction) compounds.

Said IHR-compounds are used in ballasted diffusion-resistant form and may be IHO-compounds in oxidized state or in general compounds wherefrom by reduction and hydrolysis a diffusible photographically useful group (PUG) is released. The IHR-compounds react neither directly nor indirectly with oxidizing substances, e.g. the oxidation product of developers, so that their diffusion resistance at the exposed areas can not be changed. They are, however, capable of reacting with reducing compounds, e.g. by direct or indirect reaction with non-oxidized photographic developer which remains at the non-exposed areas of negative working silver-halide emulsion layers. By reduction a hydrolysable compound is obtained wherefrom a diffusion-mobile part being or including a photographically useful group e.g. dye or dye precursor is set free which is capable to diffuse into an image receiving layer where it is fixed.

In a preferred embodiment the IHR-compounds are used in conjunction with an electron-donor compound (ED-compound) or electron donor-precursor compound (EDP-compound) which yield the electrons necessary for the PUG-releasing reaction. In order to have a better control on the desired sequence of reactions the ED or EDP-compounds are used preferably in admixture with so-called electron-transfer agents (ETA-compounds). Generally, the electron-transfer agent is a compound that is a better silver halide reducing agent under the applied conditions of processing than the electron donor and, in those instances where the electron donor is incapable of, or substantially ineffective in developing the silver halide, the ETA-compound functions to develop the silver halide and provides a corresponding pattern of oxidized electron donor because the oxidized ETA-compound readily accepts electrons from the ED-compound.

The ED-compound is used preferably in non-diffusible state in each silver halide emulsion layer containing an IHR-compound. The ETA-compound on the contrary is preferably used as developing agent in diffusible state. In this way the reactions are better separated in their desired sequence in that first the image-wise oxidation of the ETA-compound by the exposed silver halide starts, then the rapid electron transfer to oxidized ETA-compound from the ED-compound takes place, which ED-compound were unaffected finally reduces the IHR-compound to make it hydrolysable and releasing the PUG-compound in diffusible state.

In accordance with the invention described in the published European Patent Application No. 0004399 a photographic silver halide material is provided which contains in operative contact with the silver halide an IHR-compound being a quinonoid compound, which is initially immobile in an alkali-permeable colloid medium and wherefrom through the reducing action of a silver halide developing agent and alkalinity a photographically useful substance, e.g. a dye, a dye precursor, a colour coupler, a fog-inhibiting compound, a developing-retarding compound or another species active in photographic imaging, can be split off in diffusible state said quinonoid compound corresponding to one of the general formulae (A) and (B):

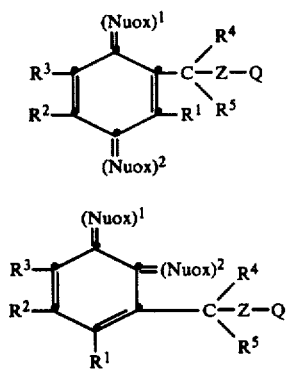

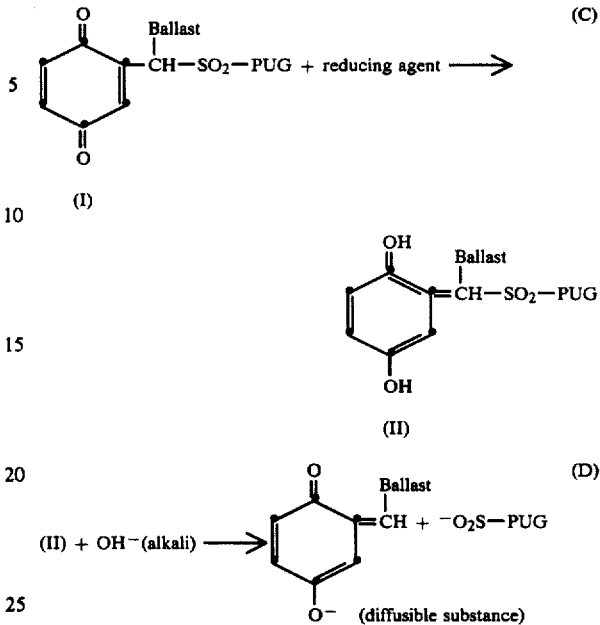

wherein:

each of $(Nuox)^1$ and $(Nuox)^2$ (same or different) represents an oxidized nucleophilic group such as a $O=$ group or $HN=$ group, Z represents a bivalent atomic group, which is electronegative with respect to the carbon atom carrying $R^4$ and $R^5$, e.g. a sulphonyl group, Q together with the Z group represents a releasable photographically useful group, e.g. a diffusible dye group, each of $R^1$, $R^2$ and $R^3$ is a mono-atomic group e.g. hydrogen, a halogen atom, or a polyatomic group, e.g. an alkyl group, an alkoxy group, an acylamino group wherein the acyl group is derived from aliphatic or aromatic carboxylic or sulphonic acids, or $R^1$ and $R^2$ together when in adjacent positions on the ring form a ring fused with the remainder of the molecule, e.g. a benzene ring, or $R^2$ and $R^3$ together form a ring fused with the remainder of the molecule, e.g. a benzene ring, and each of $R^4$ and $R^5$ (same or different) represents hydrogen or a hydrocarbon group including a substituted hydrocarbon group, e.g. an alkyl group.

In at least one of the substituents $R^1$, $R^2$, $R^3$, $R^4$ or $R^5$ a ballasting group X e.g. alkyl group of sufficient size is present to render said compound immobile in an alkali-permeable layer of the photographic material.

The reaction mechanism operative in the release of a photographically useful substance from the above mentioned quinonoid compounds consists of two stages (C) and (D):

wherein:

"Ballast" stands for a ballasting group and PUG represents a photographically useful group e.g. a dye moiety. It is not necessary, however, that the ballasting group is linked to the

group. Indeed, likewise any place on the quinone-nucleus will satisfy the purpose of obtaining an initially diffusion resistant quinonoid compound (I).

In practice there is a demand for a system wherein the photographically useful substance is split off rapidly but also substantially inversely proportional to the concentration of photoexposed silver halide. In other words when processing an image-wise exposed silver halide emulsion of the negative type in operative association with the quinonoid compound and a developing agent said diffusible substance should not be freed up to an unacceptable level in correspondence with the white or clear areas of the photographed original or scene but should still be set free sufficiently rapidly in the less exposed or non-exposed areas where the concentration of developing agent remained high. When the reduction of compound (I) with the reducing agent(s) and the hydrolysis of compound (II) prevail over the reduction of the photo-exposed silver halide, too large an amount of photographically useful substance is split off in the area where it is not wanted. In the case where the photographically useful substance is a dye an undesirable dye fog is obtained in the receptor element. When, however, the reducibility of the quinonoid compound (I) is too low no acceptable dye densities are obtained within reasonable processing times required e.g. for in-camera processing applied in instant photography.

To compromise between so-called fog level and sufficient image-wise release of photographically useful substance within short processing times it has been proposed according to published European Patent Application No. 0038092 to directly substitute the quinone nucleus with (a) monovalent organic ring or ring system substituent(s) having aromatic character. By means of the thus substituted compounds within a relatively short processing time, one minute or less, an image-wise release of photographically useful substance without unacceptable fog takes place.

These aromatically substituted quinonoid compounds correspond to one of the general formulae (E) and (F):

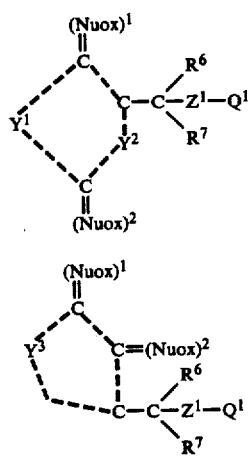

wherein:

each of $(Nuox)^1$ and $(Nuox)^2$ (same or different) represents an oxidized nucleophilic group e.g. a O= group or HN= group, $Z^1$ represents a bivalent atom e.g.—S—, or a bivalent group e.g. a sulphonyl group, which is electronegative with respect to the carbon atom carrying $R^6$ and $R^7$, $Q^1$ together with the group $Z^1$ represents a releasable photographically useful group, e.g. a releasable group yielding a diffusible photographically useful substance as hereinbefore set forth, more particularly a diffusible dye, $Y^1$ and $Y^2$ together represent the necessary atoms to close a p-quinonoid ring substituted with (a) directly linked monovalent organic ring or ring system substituent(s) having aromatic character, $Y^3$ represents the necessary atoms to close an o-quinonoid ring substituted with (a) directly linked monovalent organic ring or ring system substituent(s) having aromatic character, each of $R^6$ and $R^7$ (same or different) represents hydrogen, a hydrocarbon group including a substituted hydrocarbon group e.g. an alkyl group including a substituted alkyl group or an aryl group including a substituted aryl group preferably one of them is a phenyl group including a substituted phenyl group, at least $R^6$, $R^7$ or a substitutent on the quinonoid ring being or containing a ballasting group X e.g. an alkyl group of sufficient size to keep said compound immobile in an alkalipermeable layer of the photographic material, when said layer is permeated with an alkaline liquid.

From the above it is clear that by proper substitution of the quinone nucleus chemical reactivity i.e. reducibility can be controlled. It has been established experimentally however, that not only the reducibility but also the hydrolysability of the reduced quinonoid part i.e. the hydroquinonoid part acting as "carrier" part with respect to the dye moiety, plays a role in the speed of the dye release.

A somewhat retarded hydrolysis is obtained by reducing the hydrophilicity of the hydroquinonoid compound and consequently also of the quinonoid compound. Such is in favor of a dye release that does not depend very much on the structure of the dye moiety (cyan, magenta and yellow). As can be learned from Example 1 of published European Patent Application 0 049 002 different substituents on the quinonoid nucleus bring the speed of dye release of dye releasing compounds with a different dye moiety as good as possible to the same level.

It is particularly advantageous if the same "carrier" part can be used for the three primary colour dye releasing compounds in a tri-colour photographic material, so as to obtain acceptable maximum dye densities with economical processing times, and without the production of disproportionate fog levels for a same maximum density.

The present invention provides IHR-dye releasing compounds having a quinonoid carrier part suitable for use in such materials, and which in particular have an improved Dmax/Dmin relationship, wherein Dmax stands for maximum dye density and Dmin stands for minimum dye density i.e. dye fog.

It is another object of the present invention to provide a photographic silver halide dye diffusion transfer material which includes different IHR-dye releasing compounds with a same carrier part for producing cyan, magenta and yellow dye images. Other objects and advantages will become apparent from the further description.

The IHR-dye releasing compound according to the present invention is a quinoid compound corresponding to the following general formula (G):

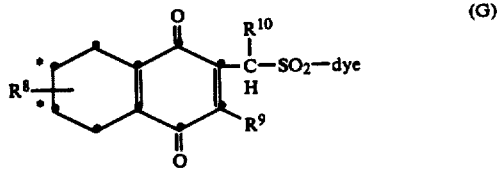

wherein:

$R^8$ is hydrogen or methyl in the 6- or 7-position (indicated by an asterisk) on the saturated adjacent ring part of the quinonoid nucleus, $R^9$ is an alkyl group e.g. n-propyl, or a substituted alkyl group, or is an aromatic group, e.g. a phenyl group, or a substituted aromatic group e.g. an alkoxyphenyl group which is preferred, $R^{10}$ is hydrogen or an alkyl group e.g. methyl or an aryl group e.g. phenyl, and at least one of the substituents $R^9$ and $R^{10}$ represents or includes a ballasting group, e.g. an alkyl group, of sufficient size to render said compound immobile in an alkalipermeable hydrophilic colloid layer when such layer is permeated with an aqueous alkaline liquid.

Compounds according to the above general formula (G) are not directly dye releasing but are to be reduced therefor to form the corresponding hydroquinonoid compounds which then are susceptible to a hydrolytic cleavage under alkaline conditions whereby the —SO₂—dye moiety is set free in diffusible state as sulphinic acid anion.

In the preparation of compounds according to general formula (G) the carrier part is linked to the dye moiety e.g. according to the following reaction scheme:

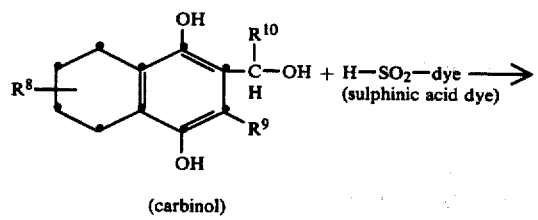

(carbinol)

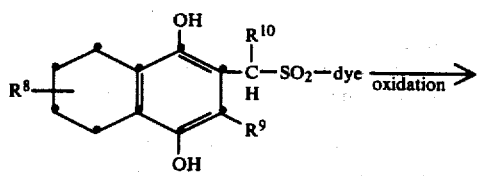

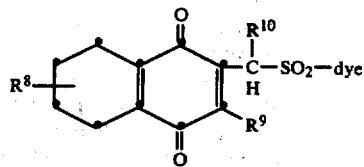

The introduction of a fused saturated carbocyclic ring part on the quinone nucleus proceeds via the Diels-Alder reaction using butadiene or isoprene and a quinone.

Diels-Alder reactions of conjugated dienes with p-benzoquinones are amply described in the chemical literature. Particular reference is made to reports of Ansell, Nash and Wilson (J. Chem. Soc. 1963, 3012-3028) and L. F. Fieser (J. Amer. Chem. Soc. 70, 3165-317 (1948). Additional information can be found in reviews of Butz and Rytina (Organic Reactions 5, 136-192 (1949)), Finley (in S. Patai—The Chemistry of the quinonoid compounds, part 2. pp. 986-1018, Wiley, New York 1974) and H. Ulrich and R. Richter (in Houben-Weyl—Methoden der Organischen Chemie, Volume VII/3a, G. Thieme Verlag, Stuttgart 1977, pp. 80-85).

A synthesis route for obtaining an above defined carbinol is exemplified below:

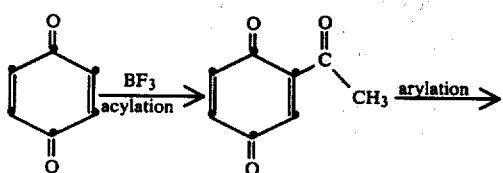

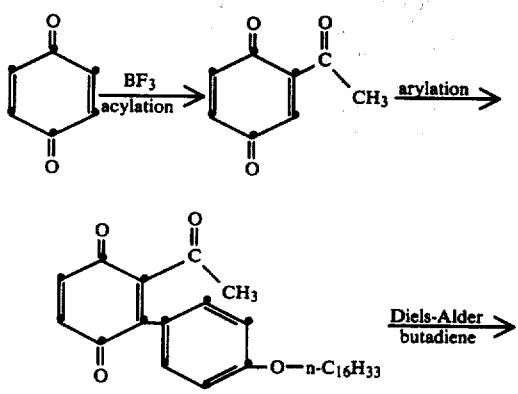

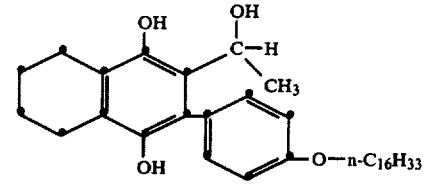

In an alternative route the relative stage of the Diels-Alder reaction with respect to acylation and arylation is reversed:

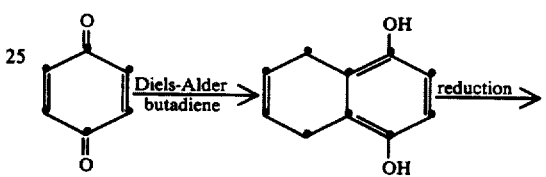

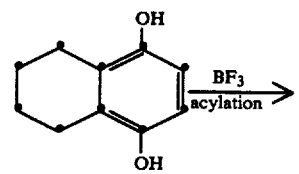

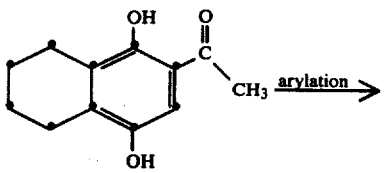

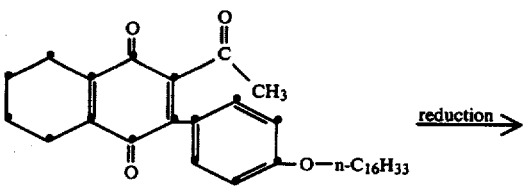

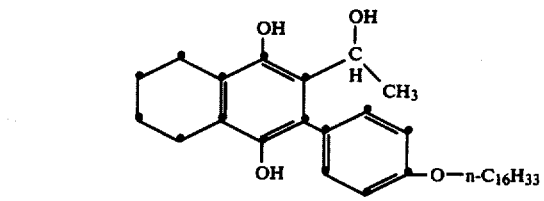

It should be noted that if isoprene is used as the diene in the Diels-Alder reaction of either route the products resulting from that reaction are mixtures of the two possible regio isomers, one having a methyl substituent in position 6 and one having the methyl substituent in position 7. Although these can be separated it is not necessary to do so as the mixtures behave photographically in the same way as the separated components.

The synthesis of compounds within the scope of general formula (G) is given hereinafter in more details with respect to the compounds of Tables 1, 2a, 2b and 3 relating to cyan, magenta (2a, 2b) and yellow dye releasing compounds respectively. The synthesis follows one of the above schemes.

TABLE 1

| Compound | $R^8$ | $R^9$ | $R^{10}$ | R' | L | n |
|---|---|---|---|---|---|---|
| 1C | H | p-cetyloxyphenyl | $CH_3$ | — | — | 0 |
| 2C | $CH_3$ | p-cetyloxyphenyl | $CH_3$ | — | — | 0 |
| 3C | H | n-$C_3H_7$ | n-$C_{13}H_{27}$ | — | — | 0 |
| 4C | $CH_3$ | n-$C_3H_7$ | n-$C_{13}H_{27}$ | — | — | 0 |
| 5C | H | p-cetyloxyphenyl | $CH_3$ | 6-$OCH_3$ | 3-$NHSO_2$ | 1 |
| 6C | H | n-$C_3H_7$ | n-$C_{13}H_{27}$ | 6-$OCH_3$ | 3-$NHSO_2$ | 1 |
| 7C | H | n-$C_3H_7$ | n-$C_{13}H_{27}$ | — | 4-$NHSO_2$ | 1 |

TABLE 2a

| Compound | $R^8$ | $R^9$ | $R^{10}$ | n | R' | position of $-NH-SO_2-$ |
|---|---|---|---|---|---|---|
| 1M | H | p-cetyloxyphenyl | $CH_3$ | 0 | — | — |
| 2M | $CH_3$ | p-cetyloxyphenyl | $CH_3$ | 0 | — | — |
| 3M | H | n-$C_3H_7$ | n-$C_{13}H_{27}$ | 0 | — | — |
| 4M | $CH_3$ | n-$C_3H_{27}$ | n-$C_{13}H_{27}$ | 0 | — | — |
| 5M | H | p-cetyloxyphenyl | $CH_3$ | 1 | 4-$OCH_3$ | 3 |
| 6M | H | p-cetyloxyphenyl | $CH_3$ | 1 | 6-$OCH_3$ | 3 |

TABLE 2b

| Compound | $R^{10}$ | $R^9$ | $R^8$ | R' | Positon of $-N=N$ | R |
|---|---|---|---|---|---|---|
| 7M | $CH_3$ | p-cetyloxyphenyl | H | 4-$OCH_3$ | 3 | $N(CH_3)_2$ |
| 8M | $CH_3$ | p-cetyloxyphenyl | H | 6-$OCH_3$ | 3 | $N(CH_3)_2$ |
| 9M | n-$C_{13}H_{27}$ | n-$C_3H_7$ | H | — | 4 | $N(CH_3)_2$ |
| 10M | n-$C_{13}H_{27}$ | n-$C_3H_7$ | H | 6-$OCH_3$ | 3 | $N(CH_3)_2$ |

TABLE 2b-continued

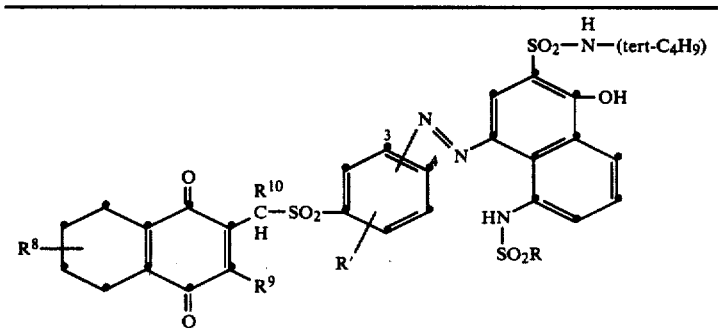

| Compound | R¹⁰ | R⁹ | R⁸ | R' | Positon of —N=N— | R |
|---|---|---|---|---|---|---|
| 11M | CH₃ | p-cetyloxyphenyl | H | — | 4 | N(CH₃)₂ |
| 12M | CH₃ | p-cetyloxyphenyl | H | — | 3 | CH₃ |
| 13M | CH₃ | p-cetyloxyphenyl | H | — | 4 | CH₃ |
| 14M | CH₃ | p-cetyloxyphenyl | H | 6-OCH₃ | 3 | CH₃ |
| 15M | CH₃ | p-cetyloxyphenyl | H | 4-OCH₃ | 3 | CH₃ |

TABLE 3

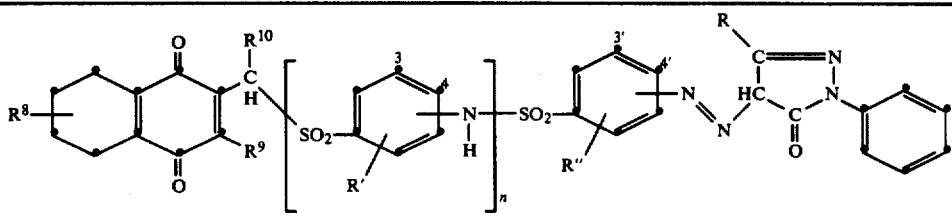

| Compound | R⁸ | R⁹ | R¹⁰ | n | R' | position H—N—SO₂— | R'' | position —N=N— | R |
|---|---|---|---|---|---|---|---|---|---|
| 1Y | H | p-cetyloxyphenyl | CH₃ | 0 | — | — | 4'-OCH₃ | 3' | CH₃ |
| 2Y | CH₃ | " | CH₃ | 0 | — | — | 4'-OCH₃ | 3' | CH₃ |
| 3Y | H | n-C₃H₇ | n-C₁₃H₂₇ | 0 | — | — | 4'-OCH₃ | 3' | CH₃ |
| 4Y | CH₃ | " | " | 0 | — | — | 4'-OCH₃ | 3' | CH₃ |
| 5Y | H | " | " | 1 | — | 4 | 4'-OCH₃ | 3' | CH₃ |
| 6Y | H | " | " | 1 | — | 4 | — | 4' | CONHCH₃ |
| 7Y | H | " | " | 1 | 4-OCH₃ | 3 | 4'-OCH₃ | 3' | CH₃ |
| 8Y | H | " | " | 1 | 4-OCH₃ | 3 | — | 4' | CONHCH₃ |
| 9Y | H | " | " | 1 | 6-OCH₃ | 3 | 4'-OCH₃ | 3' | CH₃ |
| 10Y | H | p-cetyloxyphenyl | CH₃ | 1 | 4-OCH₃ | 3 | 4'-OCH₃ | 3' | CH₃ |
| 11Y | H | " | " | 1 | 4-OCH₃ | 3 | — | 4' | CONHCH₃ |
| 12Y | H | " | " | 1 | 6-OCH₃ | 3 | 4'-OCH₃ | 3' | CH₃ |
| 13Y | H | " | " | 1 | 6-OCH₃ | 3 | — | 4' | CONHCH₃ |
| 14Y | H | " | " | 1 | 6-OCH₃ | 3 | — | 4' | CONHsec-C₄H₉ |
| 15Y | H | " | " | 1 | 4,6-di-OCH₃ | 3' | 4'-OCH₃ | 3' | CH₃ |
| 16Y | H | " | " | 1 | 4,6-di-OCH₃ | 3 | — | 4' | CONHCH₃ |
| 17Y | H | " | " | 0 | — | — | 6'-OCH₃ | 3' | CONH₂ |
| 18Y | H | " | " | 0 | — | — | 4'-OCH₃ | 3' | CONH₂ |
| 19Y | H | " | " | 0 | — | — | — | 4' | CONH₂ |
| 20Y | H | " | " | 0 | — | — | 6'-OCH₃ | 3' | CONCH₂CH₂OCH₃ |
| 21Y | H | " | " | 0 | — | — | 4'-OCH₃ | 3' | " |
| 22Y | H | " | " | 0 | — | — | 4',6'-di-OCH₃ | 3' | " |
| 23Y | H | " | " | 0 | — | — | — | 4' | " |
| 24Y | H | " | " | 0 | — | — | 6'-OCH₃ | 3' | CONH(CH₂)₃OCH₃ |
| 25Y | H | " | " | 0 | — | — | — | 4' | " |
| 26Y | H | " | " | 0 | — | — | 6'-OCH₃ | 3' | CONH(CH₂)₂OH |
| 27Y | H | " | " | 0 | — | — | 6'-OCH₃ | 3' | CONH(CH₂)₃OH |
| 28Y | H | " | " | 0 | — | — | — | 4' | CONH(CH₂)₃OH |
| 29Y | H | " | " | 0 | — | — | 6'OCH₃ | 3' | CONHCH₂CH(OH)CH₃ |
| 30Y | H | " | " | 0 | — | — | — | 4' | " |
| 31Y | H | " | " | 0 | — | — | 6'OCH₃ | 3' | CONH(CH₂CH₂O)₂H |
| 32Y | H | " | " | 0 | — | — | — | 4' | " |
| 33Y | H | " | " | 0 | — | — | — | 4' | CONH—sec-butyl |
| 34Y | H | " | " | 0 | — | — | 6'-OCH₃ | 3' | " |
| 35Y | H | " | " | 0 | — | — | 4'-OCH₃ | 3' | CONH—n-butyl |
| 36Y | H | " | " | 0 | — | — | 6'OCH₃ | 3' | " |
| 37Y | H | " | " | 0 | — | — | — | 4' | " |
| 38Y | H | " | " | 0 | — | — | — | 4' | CONH—n-propyl |
| 39Y | H | " | " | 0 | — | — | 4'-OCH₃ | 3' | " |
| 40Y | H | " | " | 0 | — | — | 6'-OCH₃ | 34 | " |

TABLE 3-continued

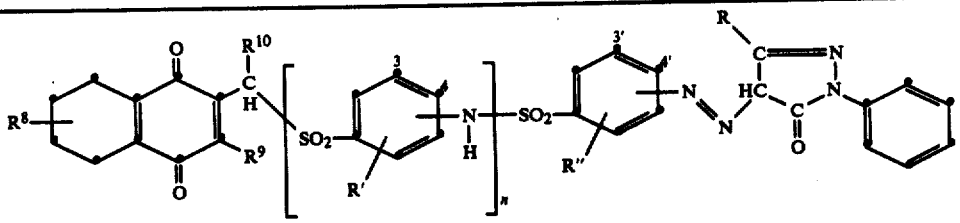

| Compound | R[8] | R[9] | R[10] | n | R' | position H —N—SO₂— | R'' | position —N=N— | R |
|---|---|---|---|---|---|---|---|---|---|
| 41Y | H | " | " | 0 | — | — | — | 4' | CONH(CH₂)₂NH₂ |
| 42Y | H | " | " | 0 | — | — | — | 4' | CONH(CH₂)₂NHCOCH₃ |
| 43Y | H | " | " | 0 | — | — | — | 4' | CONH(CH₂)₂NHSO₂CH₃ |
| 44Y | H | " | " | 0 | — | — | 6'-OCH₃ | 3' | CONH(CH₂)₂SO₃H |

Preparation A of compound 1Y

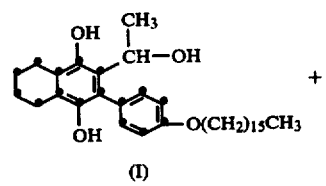

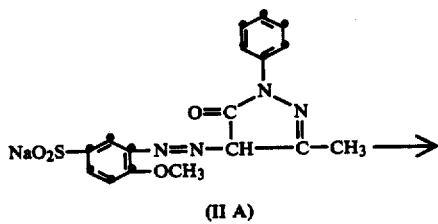

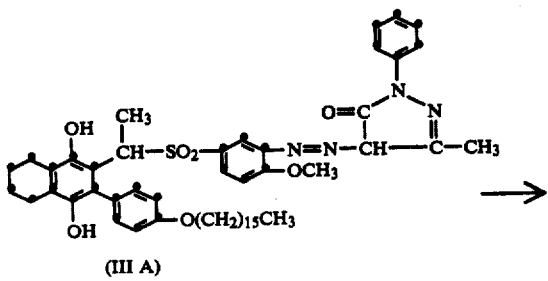

15.7 g of compound (I) and 14.4 g of compound (IIA) (containing 80% by weight of NaSO₂-salt in admixture with NaCl) were stirred in 225 ml of acetic acid and 45 ml of water. Stirring proceeded for 2 h at 80° C. Thereupon the reaction mixture was cooled to 50° C. The precipitate was separated by suction filtering and washed with a mixture of methanol/water (1/1 by volume), till free of acid. The product (IIIA) was dried in a ventilated oven. Yield: 22 g.

—10.97 g of compound (IIIA) and 1.78 g of p-benzoquinone were stirred in 120 ml of dichloroethane kept boiling with reflux for 2 h. After cooling to 20° C. the formed fine precipitate was separated by suction and washed with a little of dichloroethane. The filtrate was concentrated to recover as much as possible of compound 1V. Yield: 10.6 g.

Preparation B of compound 1M

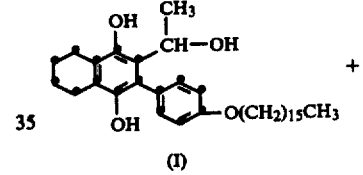

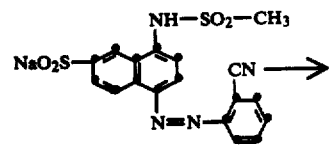

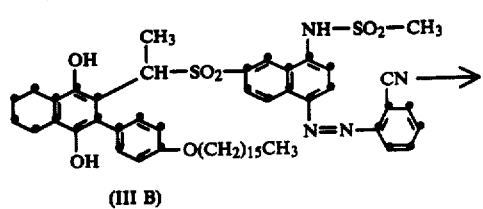

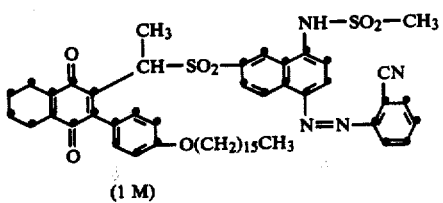

—15.7 g of compound (I) and 37.4 g of compound (IIB) (containing 35% by weight of NaSO₂-salt in admixture with NaCl) were stirred in 300 ml of acetic acid and 50 ml of water. Stirring proceeded for 2 h at 70° C. Thereupon the reaction mixture was cooled to 50° C. The precipitate was separated by suction filtering and washed with a mixture of methanol/water (1/1 by volume), till free of acid. The product (IIIB) was dried in a ventilated oven. Yield: 21 g.

—10.12 g of compound (IIIB) and 1.3 g of p-benzoquinone were stirred in 120 ml of dichloroethane kept boiling with reflux for 2 h. After cooling to 20° C. the formed fine precipitate was separated by suction and washed with a little of dichloroethane. The filtrate was concentrated to recover as much as possible of compound 1M. Yield: 10 g.

Preparation C of compound 1C

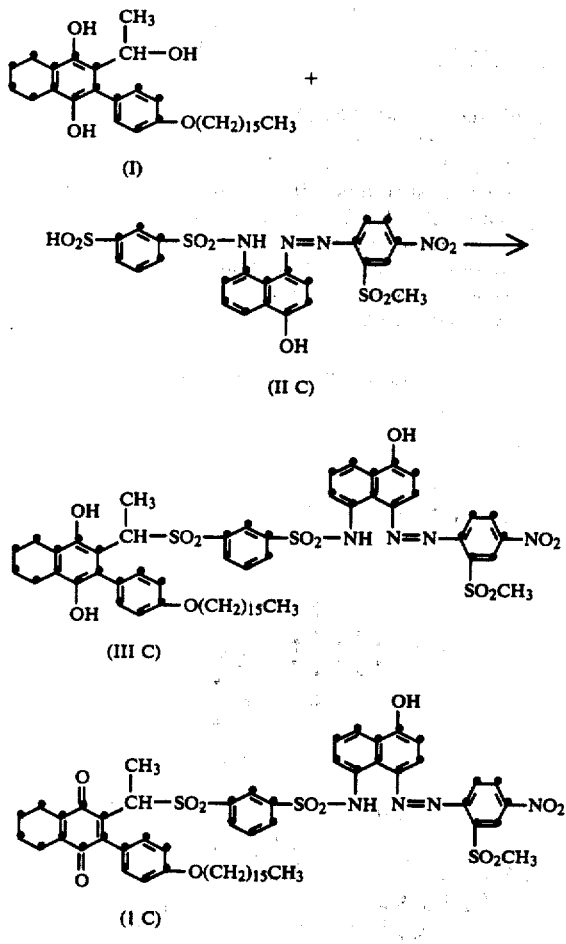

—15.7 g of compound (I) and 17.7 g of compound (IIC) were stirred in 300 ml of acetic acid and 50 ml of water. Stirring proceeded for 2 h at 70° C. Thereupon the reaction mixture was cooled to 50° C. The precipitate was separated by suction filtering and washed with a mixture of methanol/water (1/1 by volume), till free of acid. The product (IIIC) was dried in a ventilated oven. Yield: 28.5 g.

—14.8 g of compound (IIIC) and 1.6 g of p-benzoquinone were stirred in 150 ml of dichloroethane kept boiling with reflux for 6 h. After cooling to 20° C. the formed fine precipitate was separated by suction and washed with a little of dichloroethane. The filtrate was concentrated to recover as much as possible of compound 1C. Yield: 9.7 g.

Synthesis of intermediate products in the preparation of compounds 1Y, 1M and 1C 1296 g of p-benzoquinone were stirred in 6.6 l of acetic acid. The solution was cooled to 10°–15° C. 780 g (1250 ml) of butadiene were added whilst stirring. The reaction mixture was kept for 3 days at room temperature and thereupon boiled with reflux for 2 h. After cooling to room temperature the formed precipitate was separated by suction filtering and washed with a mixture of 1200 ml of water/acetic acid (1/1 by volume) and thereupon with a mixture of water/methanol (1/2 by volume). The product: 1,4-dihydroxy-5,8-dihydro-naphthalene was dried in a ventilated oven. Yield: 1285 g.

—36.88 g of 1,4-dihydroxy-5,8-dihydro-naphthalene were admixed with 5 ml of Raney-nickel and anhydrous ethanol was added up to a volume of 250 ml. The reduction was carried out in a shaking autoclave starting with a hydrogen pressure of 105.3 kg per sq.cm at 23° C. Within a period of 20 minutes a hydrogen consumption corresponding with 110% of the theoretical value was noticed. The reaction mixture was poured into 600 ml of water, the precipitate removed by suction. After washing with water the obtained 1,4-dihydroxy-5,6,7,8-tetrahydro-naphthalene was dried. Yield: 24.6 g.

—410 g of 1,4-dihydroxy-5,6,7,8-tetrahydro-naphthalene were stirred in 520 ml of concentrated acetic acid. At 80° C. BF$_3$-gas was introduced for 1 h and stirring continued. The reaction mass solidified suddenly whereupon the temperature raised to 100° C. The reaction mixture was cooled down and put into a solution of 600 g of sodium acetate dissolved in 2.4 l of water. The whole mass was stirred forming a fine precipitate which was separated by suction filtering and stirred again this time in 1.2 l of methanol whereto 3 l of water were added. The purified product was separated by suction filtering and dried in a ventilated oven at 50° C. Yield: 495 g of 1,4-dihydroxy-2-acetyl-5,6,7,8-tetrahydronaphthalene. Melting point: 199° C.

—51.5 g of 1,4-dihydroxy-2-acetyl-5,6,7,8-tetrahydro-naphthalene and 79.5 g of cetyloxybenzene were stirred in a mixture of 200 ml of methylene chloride and 125 ml of trifluoro-acetic acid. The reaction mixture was cooled down to 0° C. 115 ml of n-butyl nitrite were added dropwise at 0° C. within a period of 3 h. To the reaction mixture 500 of methanol were added. The precipitate was separated by suction filtering, washed with 80 ml of methanol and dried in a ventilated oven. Yield: 105 g of crude 1,4-dihydroxy-2-acetyl-3-p-cetyloxyphenyl-5,6,7,8-tetrahydro-naphthalene. Recrystallisation from ethyl acetate yielded 97 g of purified product.

—To 60 g of said purified product and a little of sodium methylate a sufficient amount of ethylene glycol monomethyl ether was added to obtain a total volume of 500 ml. Reduction proceeded with hydrogen gas at 90°–95 ° C. starting with a hydrogen pressure of 105 kg per sq.cm using a shaking autoclave. After 6 h of shaking 90% of the theoretical amount of hydrogen was used. The Raney-nickel was removed by filtering and to the filtrate a mixture of 300 ml of methanol and water (1:1 by volume) was added in order to make the precipitate coarser. The precipitate was separated by suction filtering and dried in a ventilated oven. Yield: 55 g of 1,4-dihydroxy-2-(1'-hydroxyethyl)-3-p-cetyloxyphenyl5,6,7,8-tetrahydro-naphthalene which is product (I) used in the preparation of the compounds 1Y, 1M and 1C respectively.

A photographic silver halide material according to the present invention comprises a support carrying at least one alkali-permeable silver halide hydrophilic colloid emulsion layer which contains therein a quinonoid compound according to general formula (G) which compound is immobile in an alkali-permeable colloid medium when contacted with an alkaline liquid and which contains a dye moiety and a ballast group, wherein said compound is capable of being reduced by a silver halide developing agent at a rate slower than that of imagewise developable silver halide in the photographic material and in reduced state is capable of releasing said dye moiety under alkaline conditions.

In an embodiment for producing multicolor images this invention relates to photographic materials that comprise a support carrying (1) a red-sensitive silver halide emulsion layer having operatively associated therewith a said quinonoid compound that is initially immobile in an alkali-permeable colloid medium and wherefrom through the reducing action of a silver halide developing agent and alkalinity a cyan dye is split off in diffusible state, (2) a green-sensitive silver halide emulsion layer having operatively associated therewith said compound of (1) with the difference that a magenta dye is split off in diffusible state, and (3) a blue-sensitive silver halide emulsion layer having operatively associated therewith said compound of (1) with the difference that a yellow dye is split off in diffusible state.

The image dye-providing moiety may be a preformed dye or a shifted dye. Dye materials of this type are well-known in the art and include azo dyes, azomethine (imine) dyes, anthraquinone dyes, alizarine dyes, merocyanine dyes, quinoline dyes, cyanine dyes and the like. The shifted dyes include those compounds whose light-absorption characteristics are shifted hypsochromically or bathochromically when subjected to a different environment such as a change in pH, a reaction with a material to form a complex, a tautomerization, reactions to change the pKa of the compound, a removal of a group such as a hydrolysable acyl group connected to an atom of the chromophore as mentioned e.g. in U.S. Pat. No. 3,260,597 of Walter J. Weyerts and Wilho M. Salminen, issued July 12, 1966. In certain embodiments, the shifted dyes are highly preferred, especially those containing a hydrolyzable group on an atom affecting the chromophore resonance structure, since the compounds can be incorporated directly in a silver halide emulsion layer or even on the exposure side thereof without substantial reduction in the light that is effective in the exposure of the silver halide. After exposure, the dye can be shifted to the appropriate colour such as, e.g., by hydrolytic removal of an acyl group to provide the respective image dye.

IHR compounds according to the present general formula (G) have particular application in a diffusion transfer process where it is desired to have a dye entity transferred to an adjacent layer or a receiving element.

The IHR compounds for use according to the invention are incorporated in the coating liquid for the layers of a photographic material by one of the usual methods. The quantity of such compound(s) used per liter of coating liquid varies within relatively wide limits e.g. dependent on the photographically useful group that is to be split off and the most suitable concentration can be found with the aid of simple tests. For example, from 0.01 to 10 g, preferably from 0.1 to 0.5 g, of IHR compound may be used per sq.m. The incorporation into the coating liquid, e.g. the silver halide emulsion, may proceed from a dispersion prepared in a sand-mill or by using ultrasound.

According to another method, it may be desired to incorporate the IHR compounds in a hydrophilic colloid layer in the form of so-called micro-capsules together with silver halide and optionally also developer substances. In that case, two or more differently sensitized light-sensitive silver halide emulsions and the appropriate diffusion resistant compounds may be combined in a single layer in the form of so-called mixed packet emulsions, for example as described in U.S. Pat. No. 2,698,794 of Leopold Godowsky, issued Jan. 4, 1955. Methods of incorporation in which an IHR compound is incorporated into a hydrophilic binder from an alkaline aqueous solution may be applied too since there is no danger of hydrolysis of the compound.

In a particular embodiment said quinonoid compound is present in a hydrophilic colloid layer adjacent to a silver halide emulsion layer, this adjacent layer being preferably situated behind, viewed in the direction of incident light during exposure, the silver halide emulsion layer.

In a specific embodiment in accordance with this invention a photographic material being a film unit is provided that is adapted to be processed by passing said unit between a pair of juxtaposed pressure-applying members, such as would be found in a camera designed for in-camera processing. The unit comprises (1) a photosensitive element, which contains a silver halide emulsion layer having associated therewith a said quinonoid compound that is initially immobile in an alkali-permeable colloid medium and wherefrom through the reducing action of a silver halide developing agent and alkalinity a dye is split off in diffusible state, (2) an image dye-receiving layer, (3) means for discharging an alkaline processing composition within the film unit such as a rupturable container, which is adapted to be positioned during processing of the film so that a compressive force applied to the container by the pressure-applying members will effect a discharge of the container's contents within the film, and (4) a silver halide developing agent, which is soluble in the alkaline processing composition located within said film unit.

The photographic material of the present invention is useful in a process comprising (1) applying an alkaline processing composition to the image-wise exposed photographic material comprising a support carrying at least one silver halide emulsion layer and at least one alkali-permeable layer (which may be the same layer as the one containing the silver halide) comprising said quinonoid compound that is initially immobile in an alkali-permeable colloid medium, wherein said compound is capable of being reduced by a silver halide developing agent at a rate slower than that of image-wise developable silver halide in the material and in reduced state is capable under alkaline conditions of releasing a dye, (2) providing said developing agent for said photographic material during application of said alkaline processing composition under conditions to effect image-wise release of said dye inversely proportionally to the image-wise development of said silver halide in the photographic material, and (3) allowing the diffusion with said alkaline processing composition of the dye out of the layer in which it was originally incorporated to have it introduced image-wise in another layer.

In an embodiment for producing dye images, this invention relates to a photographic colour diffusion transfer process comprising:

(a) treating a photographic element in accordance with this invention with an alkaline processing composition in the presence of a silver halide developing agent to effect development of each of the exposed silver halide emulsion layers, thereby image-wise oxidizing the developing agent and as an inverse function of image-wise silver halide development reducing said immobile quinonoid compound(s) that in reduced state are capable of releasing (a) dye(s);

(b) maintaining said photographic material in the alkaline medium of the processing composition for a time sufficient to release said dye(s) in diffusible state from the reduced immobile compound(s); and (c) transferring at least a portion of said dye(s) to a non-lightsensitive layer acting as a receptor layer.

For in-camera processing the photosensitive material is preferably composed such that the photosensitive silver halide emulsion layer(s) is (are) negative-working and applied to the same support as the receptor layer so as to form an integral combination of lightsensitive layer(s) and a non light-sensitive layer receiver element preferably with an opaque layer, which is alkali-permeable, reflective to light and located between the receptor layer and the silver halide emulsion layer(s). In a process using such material the alkaline processing composition may be applied between the outer photosensitive layer of the photographic element and a cover sheet, which may be transparent and superposed before exposure.

It is preferred to carry out the colour diffusion transfer process with the present quinonoid compounds in conjunction with a mixture of reducing agents at least one of which is a compound called electron donor (ED-compound) and at least one of which is a compound called electron-transfer agent (ETA-compound).

The ED-compounds are preferably non-diffusing e.g. provided with a ballasting group so that they remain within the layer unit wherein they have to transfer their electrons to the quinonoid compound.

The ED-compound is preferably present in non-diffusible state in each negative working silver halide emulsion layer containing a different non-diffusible dye or dye precursor. Examples of such ED-compound are ascorbyl palmitate and 2,5-bis(1',1',3',3'-tetramethylbutyl)-hydroquinone. Other ED-compounds are disclosed in U.S. Pat. No. 4,139,379 and in published German Patent Application 2 947 425. Instead of an ED-compound an electron-donor precursor compound can be used in the photographic material as described e.g. in published German Patent Application No. 2 809 716 and in U.S. Pat. No. 4,278,750. Particularly useful ED-precursor compounds for combination with the present IHR compounds are benzofuran derivatives disclosed in published German Patent Application No. 3 006 268 and correspond to the following general formula:

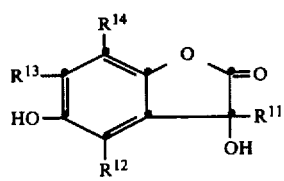

wherein:
$R^{11}$ represents a carbocyclic or heterocyclic aromatic ring, $R^{12}$, $R^{13}$ and $R^{14}$ (same or different) represent hydrogen, alkyl, alkenyl, aryl, alkoxy, alkylthio, amino, or $R^{13}$ and $R^{14}$ represent together an adjacent ring e.g. carbocyclic ring, and wherein at least one of $R^{11}$, $R^{12}$, $R^{13}$ and $R^{14}$ represent a ballast group having from 10-22 carbon atoms.

The ETA-compound is preferably used as developing agent in diffusible state and is, e.g., incorporated in mobile form in (a) hydrophilic colloid layer(s) adjacent to one or more silver halide emulsion layers or applied from the processing liquid for the dye diffusion transfer.

Typically useful ETA-compounds include hydroquinone compounds, aminophenol compounds, catechol compounds, phenylene diamines and 3-pyrazolidinone compounds e.g. 1-aryl-3-pyrazolidinone as defined e.g. in U.S. Pat. No. 4,139,379.

A combination of different ETA's such as those disclosed in U.S. Pat. No. 3,039,869 can also be employed. Such developing agents can be employed in the liquid processing composition or may be contained, at least in part, in any layer or layers of the photographic element or film unit such as the silver halide emulsion layers, the dye image-providing material layers, interlayers, image-receiving layer, etc. The particular ETA selected will, of course, depend on the particular electron donor and quinonoid compound used in the process and the processing conditions for the particular photographic element.

The concentration of ED-compound or ED-precursor compound in the photographic material may vary within a broad range but is, e.g., in the molar range of 1:1 to 8:1 with respect to the quinonoid compound. The ETA-compound may be present in the alkaline aqueous liquid used in the development step, but is used preferably in diffusible form in a non-sensitive hydrophilic colloid layer adjacent to at least one silver halide emulsion layer.

Migration of non-oxidized developing agent, e.g. acting as ETA-compound, proceeds non-image-wise and will have an adverse effect on correct colour rendering when surplus developing agent remains unoxidized in the photoexposed area of a negative working emulsion layer. Therefore, according to a preferred embodiment of the present invention a silver halide solvent e.g. thiosulphate is used to mobilize unexposed silver halide in complexed form for helping to neutralize (i.e. oxidize by physical development) migrated developing agent in the photoexposed area wherein unaffected developing agent (ETA-compound) should no longer be available for reacting with the quinonoid compound directly or through the applied ED-compound. The use of silver halide solvents for that purpose has been described in the published European Patent Application No. 0049002.

In order to obtain a more correct colour rendition it is also advantageous to intercept oxidized ETA-compound and to prevent it from migrating to adjacent imaging layers where it could cause the undesired oxidation of ED-compound. For said interception so-called scavengers are used that are incorporated in the photographic material in non-diffusible state e.g. in interlayers between the imaging layers. Suitable scavengers for that purpose are described e.g. in U.S. Pat. No. 4,205,987 and European Patent No. 29546.

In a photographic element according to the invention and containing two or more silver halide emulsion layers, each silver halide emulsion layer containing a dye image-providing material or having the dye image-providing material present in a contiguous layer may be separated from the other silver halide emulsion layer(s) in the film unit by (an) interlayer(s), including e.g. gelatin, calcium alginate, or any of the colloids disclosed in U.S. Pat. No. 3,384,483 of Richard W. Becker, issued May 21, 1968, polymeric materials such as polyvinylamides as disclosed in U.S. Pat. No. 3,421,892 of Lloyd D. Taylor, issued Jan. 14, 1969, or any of those disclosed in French Patent Specification No. 2,028,236 filed Jan. 13, 1970 by Polaroid Corporation or U.S. Pat. Nos. 2,992,104 of Howard C. Haas, issued July 11, 1961 and 3,427,158 of David P. Carlson and Jerome L. Reid, issued Feb. 11, 1969.

According to an embodiment in the preparation of a multicolour diffusion transfer material according to the present invention, a water-permeable colloid interlayer dyed with a yellow non-diffusing dye or Carey Lea silver is applied below the blue-sensitive silver halide emulsion layer containing a yellow dye-releasing compound.

In certain embodiments of the invention and especially with integral format film units, an opacifying agent can be applied from a processing composition. Examples of opacifying agents include carbon black, barium sulphate, zinc oxide, barium stearate, silicates, alumina, zirconium oxide, zirconium acetyl acetate, sodium zirconium sulphate, kaolin, mica, titanium dioxide, organic dyes such as indicator dyes, nigrosines, or mixtures thereof in widely varying amounts depending upon the degree of opacity desired. In general, the concentration of opacifying agent should be sufficient to prevent further exposure of the silver halide emulsion or emulsions of the film unit by ambient actinic radiation through the layer of processing composition, either by direct exposure through a support or by light piping from the edge of the element. For example, carbon black or titanium dioxide will generally provide sufficient opacity when they are present in the processing solution in an amount of from about 5 to 40% by weight. After the processing solution and opacifying agent have been distributed into the film unit, processing may take place out of the camera in the presence of actinic radiation in view of the fact that the silver halide emulsion(s) of the laminate is (are) appropriately protected against incident radiation, at one major surface by the opaque processing composition and at the remaining major surface by the opaque layer that is permeable to alkaline solutions. In certain embodiments, ballasted indicator dyes or dye precursors can be incorporated in a layer on the exposure side of the photosensitive layers; the indicator dye is preferably transparent during exposure and becomes opaque when contacted with the processing composition. Opaque binding tapes can also be used to prevent edge leakage of actinic radiation incident on the silver halide emulsion.

When titanium dioxide or other white pigments are employed as the opacifying agent in the processing composition, it may also be desirable to employ in co-operative relationship therewith a pH-sensitive opacifying dye such as a phthalein dye. Such dyes are light-absorbing or coloured at the pH at which image formation is effected and colourless or not light-absorbing at a lower pH. Other details concerning these opacifying dyes are described in French Patent Specification No. 2,026,927 filed Dec. 22, 1969 by Polaroid Corporation.

The substantially opaque, light-reflective layer, which is permeable to alkaline solutions, in the integral receiver film units of the present invention can generally comprise any opacifier dispersed in a binder as long as it has the desired properties. Particularly desirable are white light-reflective layers since they present esthetically pleasing backgrounds on which to view a transferred dye image and also possess the optical properties desired for reflection of incident radiation. Suitable opacifying agents include, as already mentioned with respect to the processing composition, titanium dioxide, barium sulphate, zinc oxide, barium stearate, silver flake, silicates, alumina, zirconium oxide, zirconium acetyl acetate, sodium zirconium sulphate, kaolin, mica, or mixtures thereof in widely varying amounts depending upon the degree of opacity desired. The opacifying agents may be dispersed in any binder such as an alkaline solution-permeable polymeric matrix such as, for example, gelatin, polyvinyl alcohol, and the like. Brightening agents such as the stilbenes, coumarins, triazines and oxazoles may also be added to the light-reflective layer, if desired. When it is desired to increase the opacifying capacity of the light-reflective layer, dark-coloured opacifying agents may be added to it, e.g., carbon black, nigrosine dyes, etc. Another technique to increase the opacifying capacity of the light-reflective layer is to employ a separate opaque layer underneath it comprising, e.g., carbon black, nigrosine dyes, etc., dispersed in a polymeric matrix that is permeable to alkaline solutions such as, e.g., gelatin, polyvinyl alcohol, and the like. Such an opaque layer would generally have a density of at least 4 and preferably greater than 7 and would be substantially opaque to actinic radiation. The opaque layer may also be combined with a developer scavenger layer if one is present. The light-reflective and opaque layers are generally 0.025 to 0.15 mm in thickness, although they can be varied depending upon the opacifying agent employed, the degree of opacity desired, etc.

The photosensitive substances used in this invention are preferably silver halide compositions and may comprise silver chloride, silver bromide, silver bromoiodide, silver chlorobromoiodide and the like, or mixtures thereof. The emulsions may be coarse or fine-grain and can be prepared by any of the well-known procedures, e.g., single-jet emulsions, double-jet emulsions, such as Lippmann emulsions, ammoniacal emulsions, thiocyanateor thioether-ripened emulsions such as those described in U.S. Pat. Nos. 2,222,264 of Adolph H. Nietz and Frederick J. Russell, issued Nov. 19, 1940, 3,320,069 of Bernard D. Illingsworth, issued May 16, 1967, and 3,271,157 of Clarence E. McBride, issued Sept. 6, 1966. Surface-image emulsions may be used or internal-image emulsions may be used such as those described in U.S. Pat. Nos. 2,592,250 of Edward Philip Davey and Edward Bowes Knott, issued Apr. 8, 1952, 3,206,313 of Henry D. Porter, Thomas H. James and Wesley G. Lowe, issued Sept. 14, 1965, and 3,447,927 of Robert E. Bacon and Jean F. Barbier, issued June 3, 1969. The emulsions may be regular-grain emulsions such as the type described by Klein and Moisar in J. Photogr. Sci., Vol. 12, No. 5, Sept./Oct., 1964, pp. 242–251. If desired, mixtures of surface and internal-image emulsions may be used as described in U.S. Pat. No. 2,996,382 of George W. Luckey and John C. Hoppe, issued Aug. 15, 1961.

Negative-type are normally used and when no image reversal is required likewise direct-positive emulsions may be used such as those described in U.S. Pat. Nos. 2,184,013 of John A. Leermakers, issued Dec. 19, 1939, 2,541,472 of William B. Kendall and George D. Hill, issued Feb. 13, 1951, 3,367,778 of Robert W. Berriman, issued Feb. 6, 1968, 3,501,307 of Bernard D. Illingsworth, issued Mar. 17, 1970, 2,563,785 of Charles F. Ives, issued Aug. 7, 1951, 2,456,953 of Edward Bowes Knot and Guy William Willis, issued Dec. 21, 1948, 2,861,885 of Edwin H. Land, issued Nov. 25, 1958, 3,761,276 of Francis John Evans, issued Sept. 25, 1973, 3,761,266 of Kirby Mitchell Milton, issued Sept. 25, 1973, 3,736,140 of Susan Starr Collier and Paul Brewster Gilman Jr., issued May 29, 1973, and 3,730,723 of Paul Brewster Gilman Jr., Ronald George Raleigh and Thaddeus Donald Koszelak, issued May 1, 1973, and United Kingdom Pat. No. 723,019 filed Feb. 5, 1952 by Gevaert Photo-Producten N.V.

Silver halide emulsions useful in our invention are well-known to those skilled in the art. More details about their composition, preparation and coating are described, e.g., in Product Licensing Index, Vol. 92, December 1971, publication 9232, p. 107-109.

According to one embodiment, the silver halide emulsion layers in the invention comprise photosensitive silver halide dispersed in gelatin and are about 0.2 to 2 μm thick; the dye image-providing materials are dispersed in a polymeric binder permeable to alkaline solutions, such as gelatin, to form a separate layer of about 1 to 7 μm thick, in combination with polymeric interlayers permeable to alkaline solutions, e.g., gelatin, being about 1 to 5 μm thick. Of course, these thicknesses are approximate only and may be modified according to the product desired.

The support for the photographic elements of this invention may be any material as long as it does not deleteriously affect the photographic properties of the film unit and is dimensionally stable. Typical flexible sheet materials are paper supports, e.g. coated at one or both sides with an α-olefin polymer, e.g., polyethylene; they include cellulose nitrate film, cellulose acetate film, poly(vinyl acetal) film, polystyrene film, poly(ethylene terephthalate) film, polycarbonate film, polyα-olefins such as polyethylene and polypropylene film, and related films or resinous materials. The support is usually about 0.05 to 0.15 mm thick.

For use in colour photography any material can be employed as the image-receiving layer as long as the desired function of mordanting or otherwise fixing the diffused dye will be obtained. The particular material chosen will, of course, depend upon the dye to be mordanted. If acid dyes are to be mordanted, the image-receiving layer can be composed of or contain basic polymeric mordants such as polymers of amino-guanidine derivatives of vinyl methyl ketone such as described in U.S. Pat. No. 2,882,156 of Louis M. Minsk, issued Apr. 14, 1959, and basic polymeric mordants and derivatives, e.g. poly-4-vinylpyridine, poly-2-vinylpyridine metho-p-toluene sulphonate and similar compounds described in U.S. Pat. No. 2,484,430 of Robert H. Sprague and Leslie G. Brooker, issued Oct. 11, 1949, the compounds described in the published German Patent Application No. 2,200,063 filed Jan. 11, 1971 by Agfa-Gevaert A.G. Suitable mordanting binders include, e.g. guanylhydrazone derivatives of acyl styrene polymers, as described e.g. in published German Pat. No. 2,009,498 filed Feb. 28, 1970 by Agfa-Gevaert A.G.

In general, however, other binders, e.g. gelatin, would be added to the last-mentioned mordanting binders. Effective mordanting compositions are long-chain quaternary ammonium or phosphonium compounds or ternary sulphonium compounds, e.g. those described in U.S. Pat. Nos. 3,271,147 of Walter M. Bush and 3,271,148 of Keith E. Whitmore, both issued Sept. 6, 1966, and cetyltrimethylammonium bromide. Certain metal salts and their hydroxides that form sparingly soluble compounds with the acid dyes may be used too. The dye mordants are dispersed in one of the usual hydrophilic binders in the image-receiving layer, e.g. in gelatin, polyvinylpyrrolidone or partly or completely hydrolysed cellulose esters.

Generally, good results are obtained when the image-receiving layer, which is preferably permeable to alkaline solution, is transparent and about 4 to about 10 μm thick. This thickness, of course, can be modified depending upon the result desired. The image-receiving layer may also contain ultraviolet-absorbing materials to protect the mordanted dye images from fading, brightening agents such as the stilbenes, coumarins, triazines, oxazoles, dye stabilizers such as the chromanols, alkyl-phenols, etc.

Use of pH-lowering material in the dye-image-receiving element of a film unit according to the invention will usually increase the stability of the transferred image. Generally, the pH-lowering material will effect a reduction of the pH of the image layer from about 13 or 14 to at least 11 and preferably 5 to 8 within a short time after inhibition. For example, polymeric acids as disclosed in U.S. Pat. No. 3,362,819 of Edwin H. Land, issued Jan. 9, 1968 or solid acids or metallic salts, e.g. zinc acetate, zinc sulphate, magnesium acetate, etc., as disclosed in U.S. Pat. No. 2,584,030 of Edwin H. Land, issued Jan. 29, 1952, may be employed with good results. Such pH-lowering materials reduce the pH of the film unit after development to terminate development and substantially reduce further dye transfer and thus stabilize the dye image.

An inert timing or spacing layer may be employed in practice over the pH-lowering layer, which "times" or controls the pH reduction depending on the rate at which alkali diffuses through the inert spacer layer. Examples of such timing layers include gelatin, polyvinyl alcohol or any of the colloids disclosed in U.S. Pat. No. 3,455,686 of Leonard C. Farney, Howard G. Rogers and Richard W. Young, issued July 15, 1969. The timing layer may be effective in evening out the various reaction rates over a wide range of temperatures, e.g., premature pH reduction is prevented when inbibition is effected at temperatures above room temperature, e.g. at 35° to 37° C. The timing layer is usually about 2.5 μm to about 18 μm thick. Especially good results are obtained when the timing layer comprises a hydrolysable polymer or a mixture of such polymers that are slowly hydrolysed by the processing composition. Examples of such hydrolyable polymers include polyvinyl acetate, polyamides, cellulose esters, etc.

An alkaline processing composition employed in this invention can be a conventional aqueous solution of an alkaline material, e.g. sodium hydroxide, sodium carbonate or an amine such as diethylamine, preferably possessing a pH beyond 11.

According to one embodiment the alkaline processing liquid contains the diffusible developing agent that effects the reduction of the silver halide, e.g. ascorbic acid or a 3-pyrazolidinone developing agent such as 1-phenyl-4-methyl-3-pyrazolidinone.

The alkaline processing composition employed in this invention may also contain a desensitizing agent such as methylene blue, nitro-substituted heterocyclic compounds, 4,4'-bipyridinium salts, etc., to insure that the photosensitive element is not further exposed after it is removed from the camera for processing.

The solution also preferably contains a viscosity-increasing compound such as a high-molecular-weight polymer, e.g. a water-soluble ether inert to alkaline solutions such as hydroxyethylcellulose or alkali metal salts of carboxymethylcellulose such as sodium carboxymethylcellulose. A concentration of viscosity-increasing compound of about 1 to about 5% by weight of the processing composition is preferred. It will impart thereto a viscosity of about 100 mPa.s to about 200,000 mPa.s.

Processing may proceed in a tray developing unit as is present, e.g., in an ordinary silver complex diffusion transfer (DTR) apparatus in which the contacting with a separate dye image-receiving material is effected after a sufficient absorption of processing liquid by the photographic material has taken place. A suitable apparatus for said purpose is the COPYPROOF CP 38 (trade name) DTR-developing apparatus. COPYPROOF is a trade name of Agfa-Gevaert, Antwerpen/Leverkusen.

According to other embodiments wherein the receptor layer is integral with the photosensitive layer(s) the processing liquid is applied from a rupturable container or by spraying.

The rupturable container that may be employed in this invention may be of the type disclosed in US Patent Specification Nos. 2,543,181 of Edwin H. Land, issued Feb. 27, 1951, 2,643,886 of Ulrich L. di Ghilini, issued June 30, 1953, 2,653,732 of Edwin H. Land, issued Sept. 29, 1953, 2,723,051 of William J. McCune Jr., issued Nov. 8, 1955, 3,056,492 and 3,056,491, both of John E. Campbell, issued Oct. 2, 1962, and 3,152,515 of Edwin H. Land, issued Oct. 13, 1964. In general such containers comprise a rectangular sheet of fluid and air-impervious material folded longitudinally upon itself to form two walls that are sealed to one another along their longitudinal and end margins to form a cavity in which processing solution is contained.

While the alkaline processing composition used in this invention can be employed in a rupturable container, as described previously, to facilitate conveniently the introduction of processing composition into the film unit, other means of discharging processing composition within the film unit could also be employed, e.g., means injecting processing solution with communicating members similar to hypodermic syringes, which are attached either to a camera cartridge, as described in U.S. patent specification No. 3,352,674 of Donald M. Harvey, issued Nov. 14, 1967.

The following comparative example further illustrates the invention. All percentages and ratios are by weight, unless otherwise mentioned.

EXAMPLE 1

Preparation of test strips 1–15

A subbed water-resistant paper support consisting of a paper sheet of 110 g/sq.m coated at both sides with a polyethylene stratum of 15 g/sq.m was treated with a corona discharge and thereupon coated in the mentioned order with the following layers:

| | | |
|---|---|---|
| (1) an alkali-permeable colloid layer containing after drying and hardening per sq. m: | | |
| gelatin | 1.5 | g |
| cyan dye-providing quinonoid compound (see table 4) | 0.26 | mmole |
| (applied from a dispersion prepared as described hereinafter) | | |
| silver chloride | 0.498 | g |
| (applied from a red-sensitized gelatin-silver chloride emulsion) | | |
| 2,5-bis(1',1',3',3'-tetramethylbutyl)-hydroquinone | 0.102 | g |
| (2) an interlayer containing per sq. m: | | |
| gelatin | 1.155 | g |
| 1-phenyl-4-methyl-3-pyrazolidinone (added from a dispersion prepared as described hereinafter) | 0.084 | g |
| 2-acetyl-5-octadecyl (2)-hydroquinone | 0.096 | g |
| as magenta filtering dye Pigment Red 146 (C.I. 11,000) | 0.910 | g |
| (3) an alkali-permeable colloid layer containing per sq. m: | | |
| gelatin | 1.285 | g |
| magenta dye-providing quinonoid compound (see Table 4) | 0.31 | mmole |
| (applied from a dispersion prepared as described hereinafter) | | |
| 2,5-bis(1',1',3',3'-tetramethylbutyl)-hydroquinone | 0.104 | g |
| silver chloride (applied from a green-sensitized gelatin-silver chloride emulsion) | 0.553 | g |
| (4) an interlayer containing per sq. m: | | |
| gelatin | 1.155 | g |
| 1-phenyl-4-methyl-3-pyrazolidinone | 0.084 | g |
| 2-acetyl-5-octadecyl(2)-hydroquinone | 0.096 | g |
| as yellow filtering dye Pigment Yellow 83 (C.I. 20,000) | 1.085 | g |
| (5) an alkali-permeable colloid layer containing per sq. m: | | |
| gelatin | 2.046 | g |
| yellow dye-providing quinonoid compound $Y^1$ | 0.56 | mmole |
| (applied from a dispersion as described hereinafter) | | |
| 2,5-bis-(1',1',3',3'-tetramethylbutyl)-hydroquinone | 0.187 | g |
| silver chloride | 0.500 | g |
| (applied from a blue-sensitive gelatin-silver chloride emulsion) | | |

| (6) a protective layer containing per sq. m: | |
|---|---|
| gelatin | 0.112 g |

—Preparation of the dispersion of 1-phenyl-4-methyl-3-pyrazolidinone

The preparation proceeded by sand-milling the following ingredients:

| gelatin | 40 g |
|---|---|
| 1-phenyl-4-methyl-3-pyrazolidinone | 10 ml |
| 40% aqueous solution of LOMAR D (trade name) | |
| distilled water | 850 ml |

(LOMAR D is a trade name of Nopco Chemical Company, Newark, N.J., U.S.A. for a naphthalene sulphonate condensate, formaldehyde being used in the condensation reaction).

500 g of 2,5-bis(1',1',3',3'-tetramethylbutyl)-hydroquinone is dissolved in 2 l of ethyl acetate and 500 g of tricresylphosphate and at 77° C. and 38.5 g NEKAL BX is added (NEKAL BX is a trade name of BASF W.Germany for sodium 1,6-di-isobutyl-naphthalene-3-sulfonate). The solution is left to cool to 55° C. and then is added whilst thoroughly stirring to a solution (kept at 55° C.) containing

| gelatin | 250 g |
|---|---|
| demineralised water | 2.2 l |
| ethyl acetate | 500 ml |

The thus obtained predispersion is subsequently further treated in a high pressure homogeniser whereupon the ethyl acetate is removed by evaporation under reduced pressure.

—Preparation of the dispersion of yellow dye-providing compound $Y_1$

The dispersion of compound $Y_1$ synthetized as described in European Patent Application No. 0038092 and having the following structural formula:

was prepared using following ingredients:

| compound $Y_1$ | 50 g |
|---|---|
| gelatin | 75 g |
| 10% aqueous solution of MARLON A-396 (trade name) | 50 ml |
| distilled water | 625 g |

Compound $Y_1$ was first dissolved in ethyl acetate and added whilst vigorously stirring to the gelatin dissolved in the indicated amount of water to which the aqueous solution of MARLON (trade name) A-396 had been added. Thereupon the ethyl acetate was removed by evaporation under reduced pressure.

—MARLON A-396 is a trade name of Chemische Werke Hüls AG Marl/Westfalen, W.Germany for a wetting agent having the formula:

wherein R is $C_{10}$–$C_{13}$ n-alkyl.

—Preparation of the dispersion of the magenta or cyan dye-providing compounds

The preparation proceeded analogously to the preparation of the dispersion of compound $Y_1$ but the following ingredients were used:

| dye providing compound | 17 g |
|---|---|
| gelatin | 25 g |
| 10% aqueous solution of MARLON A-396 (trade name) | 10 ml |
| distilled water up to | 300 g |

In the case of insufficient solubility in ethyl acetate of the magenta or cyan providing compounds the dispersions were prepared by sandmilling the above mentioned ingredients.

According to the above described procedures different test strips (1–15) were prepared differing from each other in the choice of the magenta or cyan dye-providing compounds (Table 4). The structures of the compounds used in the several comparative test sets are given in tables 5–6.

Exposure and processing

Each of strips 1–6 was exposed through a cyan (i.e. red light absorbing) filter to fully expose the yellow and green sensitive layers whereupon the same strip was exposed to white light through a grey wedge having a constant 0.15. Each of strips 7–15 was exposed through a magenta (i.e. green light absorbing) filter to fully expose the yellow and red sensitive layers whereupon the same strip was exposed to white light through a grey wedge having a onstant 0.15.

The exposed strips were processed in contact for 1 min with a receptor material (composition as described hereinafter) in the COPYPROOF CP 38 (trade name) diffusion transfer processing apparatus containing in its tray an aqueous solution comprising per liter:

| sodium thiosulphate | 1 g |
|---|---|
| sodium hydroxide | 15 g |
| 1,4-bis-hydroxymethyl-cyclohexane | 12.5 g |
| 2-methyl-2-propyl-1,3-propane diol | 12.5 g |
| potassium bromide | 1 g |
| distilled water up to | 1000 ml |

Composition of the receptor material

To the same support as described for the above light-sensitive material a coating having the following composition was applied per sq.m:

| | |
|---|---|
| gelatin | 5 g |
| triphenyl-n-hexadecylphosphonium bromide | 2 g |
TABLE 4
| Test set No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Magenta dye providing compound | RM1 | RM1 | RM1 | RM1 | RM1 | RM1 | RM1 | RM2 | RM3 | RM4 | RM5 | 1M | 2M | 3M | 4M |
| Cyan dye providing compound | RC1 | RC2 | RC3 | RC4 | 1C | 3C | RC1 | RC1 | RC1 | RC1 | RC1 | RC1 | RC1 | RC1 | RC1 |
TABLE 5
Reference compounds cyan
RC1:
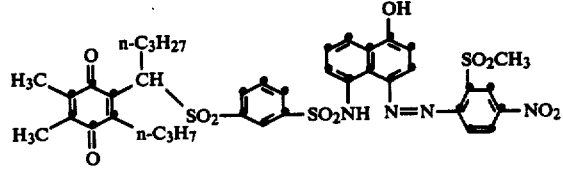
RC2:
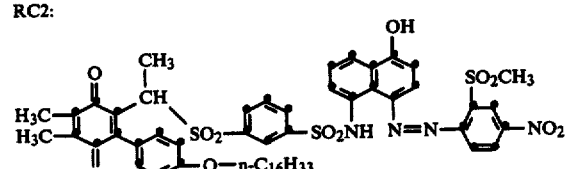
TABLE 5-continued
Reference compounds cyan
RC3:
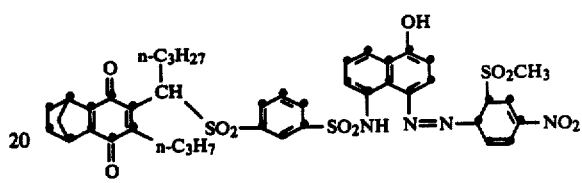
RC4:
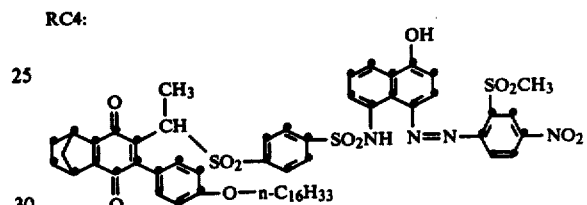
TABLE 6
Reference compounds magenta
RM1:
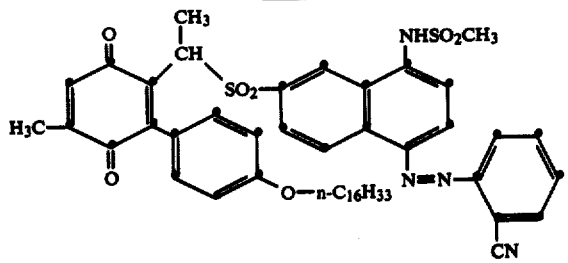
RM2:
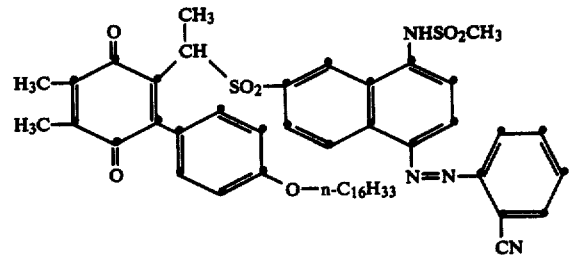
RM3:
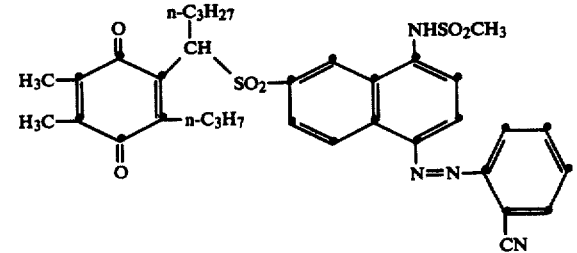

TABLE 6-continued

RM4:

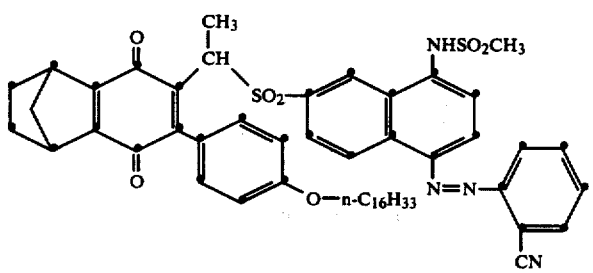

RM5:

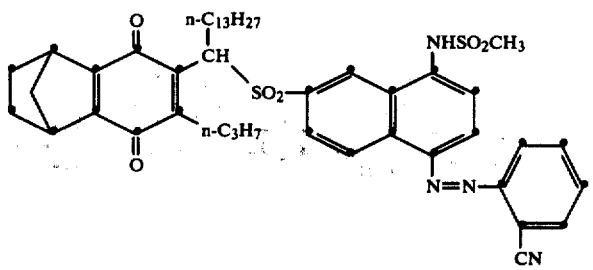

Reference compound yellow

RY1:

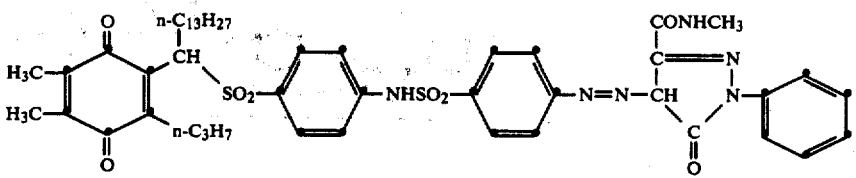

TABLE 7

Optical density results of strips 1-6

| Test strip no. | Dmin | Dmax |
| --- | --- | --- |
| 1 | 0.10 | 1.38 |
| 3 | 0.15 | 1.29 |
| 6 | 0.11 | 1.72 |
| 2 | 0.23 | 1.94 |
| 4 | 0.16 | 1.45 |
| 5 | 0.13 | 2.10 |

TABLE 8

Optical density results of strips 7-15

| Test strip no. | Dmin | Dmax |
| --- | --- | --- |
| 7 | 0.14 | 1.18 |
| 8 | 0.12 | 0.82 |
| 10 | 0.12 | 1.14 |
| 12 | 0.10 | 1.07 |
| 13 | 0.10 | 1.42 |
| 9 | 0.14 | 1.02 |
| 11 | 0.17 | 1.17 |
| 14 | 0.10 | 1.13 |
| 15 | 0.09 | 1.24 |

In Table 7 the strips 1 and 3 are to be compared with strip 6 and strips 2 and 4 with strip 5. From said comparison follows that the cyan dye providing compounds according to the present invention yield a more favourable Dmax/Dmin relationship and particularly low dye fog when considered after correction to the same Dmax.

In Table 8 strips 7, 8 and 10 should be compared with strips 12 and 13 whereas strips 9 and 11 should be compared with strips 14 and 15. The data illustrate that 5,6-dimethyl substitution on the carrier part (see the test strips 8 and 9) yields low Dmax-values whereas a fused bicyclic structure in the carrier part (see the test strips 10 and 11) results in higher fog values for a same Dmax. The magenta dye providing compounds according to the present invention are characterized by lower dye fog levels and equal to higher Dmax dye densities relative to comparable prior art compounds of published European Patent Application Nos. 0004399 and 0038092.

EXAMPLE 2

Preparation of test strips

A subbed water-resistant paper support consisting of a paper sheet of 110 g/sq.m coated at both sides with a polyethylene stratum of 15 g/sq.m was treated with a corona discharge and thereupon coated in the mentioned order with the following layers:

(1) an alkali-permeable colloid layer containing after drying and hardening per sq.m:

| | | |
| --- | --- | --- |
| gelatin | 1.285 | g |
| magenta or yellow dye providing quinonoid compound (see Table 9) (applied from a dispersion prepared as described in example 1) | 0.31 | mmole |
| 2,5-bis(1',1',3',3'-tetramethylbutyl)-hydroquinone | 0.104 | g |
| silver chloride (applied from a green sensitized gelatin-silver chloride emulsion) | 0.553 | g |

(2) a protective layer containing per sq.m (after drying and hardening):

| gelatin | 6 g |
| --- | --- |

According to this procedure different test strips were prepared differing from each other in the choice of the magenta or yellow dye-providing compound (see Table 9).

TABLE 9

| Test strip No. | 16 | 17 | 18 | 19 | 20 | 21 | 22 | 23 | 24 | 25 | 26 |
| --- | --- | --- | --- | --- | --- | --- | --- | --- | --- | --- | --- |
| Dye providing compound | RM1 | RM2 | RM3 | RM4 | RM5 | 1M | 2M | 3M | 4M | RY1 | 6Y |

Exposure and processing

Each of strips 16–24 was exposed through a green light-transmitting filter covered with a grey wedge having a constant 0.15. Each of strips 25–26 was exposed through a yellow light-transmitting filter covered with a grey wedge having a constant 0.15. Processing of the exposed strips occurred exactly as described in Example 1.

In Table 10 relating to the results obtained with magenta dye providing compounds test strips 16, 17 and 19 have to be compared with test strips 21 and 22 and test strips 18 and 20 with test strips 23 and 24. The obtained data show that the magenta dye releasing compounds of the present invention are characterized by substantially lower dye fog (Dmin) levels for a same Dmax and that dye fog does not markedly increases with contact time.

TABLE 10

| | Dmin Contact time in minutes | | | Dmax Contact time in minutes | | |
| --- | --- | --- | --- | --- | --- | --- |
| Test strip No. | 1 | 2 | 5 | 1 | 2 | 5 |
| 16 | 0.13 | 0.18 | 0.33 | 1.22 | 1.29 | 1.34 |
| 17 | 0.09 | 0.09 | 0.10 | 0.73 | 0.78 | 0.80 |
| 19 | 0.11 | 0.14 | 0.20 | 1.12 | 1.25 | 1.26 |
| 21 | 0.10 | 0.11 | 0.12 | 1.07 | 1.35 | 1.33 |
| 22 | 0.07 | 0.08 | 0.09 | 1.26 | 1.32 | 1.37 |
| 18 | 0.16 | 0.18 | 0.19 | 1.35 | 1.42 | 1.44 |
| 20 | 0.27 | 0.28 | 0.29 | 1.23 | 1.29 | 1.32 |
| 23 | 0.10 | 0.13 | 0.15 | 1.13 | 1.27 | 1.29 |
| 24 | 0.09 | 0.10 | 0.14 | 1.24 | 1.38 | 1.40 |

In Table 11 relating to the results obtained with yellow dye providing compounds test strip 25 has to be compared with test strip 26. The obtained data show that with the yellow dye providing compound according to the present invention higher Dmax values for the same as lower Dmin (fog) values are obtained.

TABLE 11

| | Dmin Contact time in minutes | | | Dmax Contact time in minutes | | |
| --- | --- | --- | --- | --- | --- | --- |
| Test strip No. | 1 | 2 | 5 | 1 | 2 | 5 |
| 25 | 0.14 | 0.16 | 0.18 | 1.02 | 1.10 | 1.10 |
| 26 | 0.14 | 0.15 | 0.17 | 1.28 | 1.32 | 1.37 |

We claim:

1. A photographic silver halide material comprising a support carrying at least one alkali-permeable silver halide hydrophilic colloid emulsion layer which contains therein a quinonoid compound which is immobile in an alkali-permeable colloid medium when permeating said medium with an alkaline aqueous liquid and which contains a dye moiety and a ballasting group, wherein said compound is capable of being reduced by a silver halide developing agent at a rate slower than that of image-wise developable silver halide in the photographic material and in reduced state is capable of releasing said dye moiety under alkaline conditions, characterized in that said quinonoid compound corresponds to the following general formula:

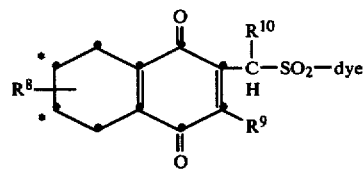

wherein:
$R^8$ is hydrogen or methyl in the 6- or 7-position (indicated by an asterisk) on the saturated adjacent ring part of the quinonoid nucleus,
$R^9$ is an alkyl group or an aromatic group,
$R^{10}$ is hydrogen, an alkyl group or an aryl group, and at least one of the substituents $R^9$ and $R^{10}$ represents or includes a ballasting group of sufficient size to render said compound immobile in an alkali-permeable hydrophilic colloid layer when such layer is permeated with an aqueous alkaline liquid.

2. A photographic material according to claim 1, characterized in that $R^9$ is an alkoxy substituted phenyl group.

3. A photographic material according to claim 1, comprising a support carrying red-, greenand blue-sensitive silver halide emulsion layers, each of said emulsion layers containing a said quinonoid compound capable of releasing a cyan, magenta and yellow dye, respectively.

4. A photographic material according to claim 1, comprising one or more negative working photosensitive silver halide emulsion layers, a supported receptor layer, and an alkali-permeable light-reflective opaque layer between said emulsion layer(s) and said supported receptor layer.

5. A photographic material according to claim 4, characterized in that the material is a film unit that is adapted to be processed by passing said unit between a pair of juxtaposed pressure-applying members, said unit comprising (1) a photosensitive element, which contains a silver halide emulsion layer having associated therewith said quinonoid compound that is initially immobile in an alkali-permeable colloid medium and wherefrom through the reducing action of a silver halide developing agent and alkalinity a dye is split off in diffusible state, (2) an image dye-receiving layer, (3) means for discharging an alkaline processing composition within the film unit, said means being a rupturable container, which is adapted to be positioned during processing of the film so that a compressive force applied to the container by the pressure-applying members will effect a discharge of the container's contents within the film, and (4) a silver halide developing agent, which is soluble in an alkaline processing composition located within said film unit.

* * * * *